:::

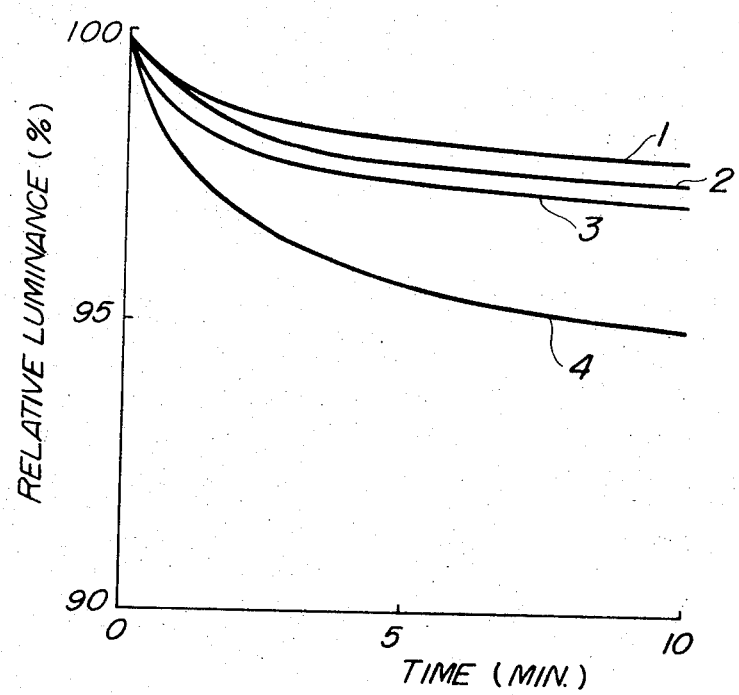

United States Patent Office 3,549,550
Patented Dec. 22, 1970

3,549,550
FLUORESCENT CALCIUM HALOPHOSPHATE PHOSPHOR CONTAINING AT LEAST ONE OF MAGNESIUM BERYLLIUM, AND LEAD
Shigeru Kamiya, Hirakata-shi, and Haruo Shibata, Takatsuki-shi, Japan, assignors to Matsushita Electronics Corporation, Osaka, Japan, a corporation of Japan
Filed Dec. 18, 1967, Ser. No. 691,272
Claims priority, application Japan, Dec. 28, 1966, 42/256
Int. Cl. C09k 1/36
U.S. Cl. 252—301.4    9 Claims

ABSTRACT OF THE DISCLOSURE

Calcium halophosphate type fluorescent substances prevented from deterioration in luminous intensity by incorporation of at least one element selected from the group consisting of magnesium, beryllium and lead.

---

This invention relates to fluorescent substances, particularly to calcium halophosphate fluorescent substances, which are inhibited from deterioration. The object of the present invention is to provide calcium halophosphate fluorescent substances which are prevented from deteriorating by incorporation of a small amount of a metal.

Ever since calcium halophosphate fluorescent substances have been invented, many studies were made to improve the characteristics thereof as fluorescent substances for fluorescent lamps, so that the luminous fluxes of fluorescent lamps could be increased. While calcium halophosphate has excellent characteristics, it has been observed as one of the defects thereof that when said calcium halophosphate fluorescent substance is irradiated with X-rays, electron rays or short wave ultraviolet rays including radiation of 1850 A., a color center is formed in the crystal matrix thereof, causing a decrease in luminous intensity. In the inside of fluorescent lamp, a light of 1850 A. is emitted in addition to ultraviolet ray of 2537 A. Therefore, when the calcium halophosphate fluorescent substance is used for a fluorescent lamp, the fluorescent substance is deteriorated with the result that the luminous intensity decreases during burning, particularly at the early stage of lighting. Fluorescent substances which are scarcely deteriorated even when irradiated with short wave ultraviolet rays including a wave length of 1850 A. are provided. The fluorescent substances according to the present invention will be illustrated below.

As mentioned above, the formation of a color center in the crystal matrix is one factor in the decrease in the luminous intensity of calcium halophosphate. It is considered that the luminous intensity of the fluorescent substance might be decreased.

Because of the fact that said color center in the crystal matrix absorbs visible rays emitted by the fluorescent substance and ultraviolet rays necessary for the excitation of fluorescent substance which are generated by discharge. The formation of a color center can be inhibited by the introduction of a suitable substance. Thus, based on the above thought, the inventors examined many kinds of additives to find that by addition of certain elements, calcium halophosphate becomes rather unstable and of greatly decreased luminous intensity, whereas by addition of certain other elements, it is markedly stabilized. As the elements having such stabilizing action, there have been found zinc, magnesium, beryllium, indium, bismuth, aluminum and lead. When any of the above elements is added to calcium halophosphate fluorescent substance, the element is substituted for a part of the calcium contained in said substance to make it possible to obtain a fluorescent substance the luminous intensity of which is scarcely decreased even when irradiated with short wave ultraviolet rays including a wave length of 1850 A.

Generally, however, if the amount of said element added to calcium halophosphate is excessively small, the desired effect cannot be obtained. On the other hand, if the amount of element is excessively increased, the absolute value of luminous intensity obtained is lowered, though the depreciation ratio of luminous intensity due to deterioration particularly at the early stage of lighting can be reduced. Accordingly, the amount of element to be added to the calcium halophosphate fluorescent substance should be as small as possible and should be such an amount as not to lower the absolute value of luminance. Regarding this point, the inventors made further examinations, adding said zinc, magnesium, beryllium, indium, bismuth, aluminum and lead to calcium halophosphate fluorescent substances to find that optimum results could be obtained by addition of at least one element selected from the group consisting of magnesium, beryllium and lead. That is, when a calcium halophosphate fluorescent substance was incorporated with 0.01 to 0.1 mol, per 6 mols of phospate radical contained in said fluorescent substance, of at least one element selected from the group consisting of magnesium, beryllium and lead, the fluorescent substance was stabilized and the decrease of absolute value luminous intensity itself due to introduction of element was substantially negligible, in practice. Accordingly, the characteristics of a fluorescent lamp using calcium halophosphate incorporated with said element could be improved, and the emission efficiency thereof could be enhanced.

The accompanying drawing shows a comparison between several examples of the present fluorescent substances and a conventional calcium halophosphate fluorescent substance in luminous intensity at the initial stage of lighting. In the drawing, each curve indicates the relationship between irradiation time and relative depreciation ratio in luminance intensity at the time when individual fluorescent substances are irradiated in an inert gas atmosphere, e.g. a nitrogen atmosphere, with short wave ultraviolet rays including a wave length of 1850 A. Curve 1 is a characteristic curve of a fluorescent substance prepared by incorporating into a calcium halophosphate fluorescent substance 0.05 mol of magnesium per 6 mols of phosphate radical contained in said fluorescent substance. Curves 2 and 3 are characteristics curves of fluorescent substances incorporated, in the same manner as above, with each 0.05 mol of beryllium and lead, respectively. Curve 4 is a characteristic curve of a fluorescent substance comprising only calcium halophosphate.

As is clear from the drawing, it is understood that in the case of the conventional fluorescent substance, the luminous intensity after 10 minutes' irradiation is about 5% lower than that immediately after irradiation, whereas in the case of the present fluorescent substances, the depreciation in luminous intensity is about 2–3%.

The following examples illustrate the preparation of the present fluorescent substance compositions.

EXAMPLE 1

The case where 0.1 mole of magnesium was incorporated per 6 mols of phosphate radical contained in the fluorescent substance composition of the present invention.

In the first place, the following starting materials were weighed.

|  | G. |
|---|---|
| Calcium hydrophosphite ($CaHPO_4$) | 816.0 |
| Calcium carbonate ($CaCO_3$) | 240.0 |
| Calcium fluoride ($CaF_2$) | 67.1 |
| Calcium chloride ($CaCl_2 \cdot 2H_2O$) | 20.6 |
| Diantimony trioxide ($Sb_2O_3$) | 21.8 |
| Manganese carbonate ($MnCO_3$) | 30.4 |
| Magnesium carbonate ($MgCO_3$) | 8.4 |

Subsequently, the above starting materials were thoroughly mixed together, and the mixture was charged into a quartz crucible and pre-fired in an electric furnace at 800°–900° C. for 45 minutes. After cooling, the mixture was pulverized in a ball mill and was again fired at 1150°–1200° C. for 60 minutes. The thus obtained fired product was powdered according to a process well known in the art and the grain size distribution of the powder was adjusted to a desired distribution to obtain a fluorescent substance. This fluorescent substance and a conventional calcium halophosphate fluorescent substance were irradiated with ultraviolet rays of 2537 A. to observe no substantial difference between the two in luminous intensity. However, when a fluorescent lamp using the fluorescent substance obtained according to the present invention and a fluorescent lamp using the conventional calcium halophosphate fluorescent substance were lighted and were compared with each other, the former was about 2% greater in emitted luminous flux value than the latter.

EXAMPLE 2

The case where 3 metals of 0.03 mol of magnesium, 0.02 mol of beryllium and 0.03 mol of lead were incorporated.

| | G. |
|---|---|
| Calcium hydrophosphite ($CaHPO_4$) | 816.0 |
| Calcium carbonate ($CaCO_3$) | 240.0 |
| Calcium fluoride ($CaF_2$) | 67.1 |
| Calcium chloride ($CaCl_2 \cdot 2H_2O$) | 20.6 |
| Diantimony trioxide ($Sb_2O_3$) | 21.8 |
| Manganese carbonate ($MnCO_3$) | 30.4 |
| Magnesium carbonate ($MgCO_3$) | 2.8 |
| Beryllium nitrate ($Be(NO_3)_2 \cdot 3H_2O$) | 6.2 |
| Lead carbonate ($PbCO_3$) | 8.9 |

The above starting materials were treated in the same manner as in Example 1 to obtain a fluorescent substance. The thus obtained fluorescent substance was essentially the same in effectiveness as that in Example 1.

As illustrated above, a fluorescent lamp can be improved in the luminous decrement as well as initial luminous flux and luminous flux by use of a fluorescent substance prepared according to the present invention by adding to a calcium halophosphate fluorescent substance at least one member selected from the group consisting of magnesium, beryllium and lead.

We claim:

1. Antimony and manganese activated calcium halophosphate phosphor, wherein 0.01 to 0.1 mol per 6 mol of phosphate radical of a member selected from the group consisting of magnesium, beryllium, lead, and mixtures of magnesium, beryllium and lead has been substituted for an equivalent amount of calcium in the said calcium halophosphate phosphor.

2. A phosphor according to claim 1, wherein said member is magnesium.

3. A phosphor according to claim 1, wherein said member is beryllium.

4. A phosphor according to claim 1, wherein said member is lead.

5. A phosphor according to claim 2, wherein the amount of magnesium substituted for calcium is 0.05 mol per 6 mols of phosphate radical.

6. A phosphor according to claim 2, where the amount of magnesium substituted for calcium is 0.1 mol per 6 mols of phosphate radical.

7. A phosphor according to claim 3, wherein the amount of beryllium substituted for calcium is 0.05 mol per 6 mols of phosphate radical.

8. A Phosphor according to claim 4, wherein the amount of lead substituted for calcium is 0.05 mol per 6 mols of phosphate radical.

9. A phosphor according to claim 1, wherein the said member is a mixture of beryllium, magnesium and lead, the amounts of each per 6 mols of phosphate radical being:

0.03 mol magnesium;
0.02 mol beryllium; and
0.03 mol lead.

References Cited

UNITED STATES PATENTS 2,476,654  7/1949  Froelich _____ 252—301.4P

TOBIAS E. LEVOW, Primary Examiner

R. D. EDMONDS, Assistant Examiner